United States Patent [19]

Kuranami et al.

[11] Patent Number: 4,896,151
[45] Date of Patent: Jan. 23, 1990

[54] SIMULTANEOUS COMMUNICATION METHOD AND SYSTEM

[75] Inventors: Shoubu Kuranami, Hadano; Masahiro Sakata, Kanagawa, both of Japan

[73] Assignee: Hitachi, Ltd., Tokyo, Japan

[21] Appl. No.: 112,212

[22] Filed: Oct. 26, 1987

[30] Foreign Application Priority Data

Oct. 28, 1986 [JP] Japan .................. 61-254604

[51] Int. Cl.$^4$ .......... H04L 1/00; G06F 15/16
[52] U.S. Cl. ............... 340/825.520; 371/32; 370/85.1; 370/94.1
[58] Field of Search ......... 340/825.52, 825.06; 371/33, 32; 370/60, 94, 85; 375/7

[56] References Cited

U.S. PATENT DOCUMENTS

| 4,241,398 | 12/1980 | Carll ............................ 375/7 |
| 4,379,946 | 4/1983 | Mizuno et al. ............. 340/825.07 |
| 4,584,684 | 4/1986 | Nagasawa et al. ................ 371/33 |
| 4,695,839 | 9/1987 | Barbu et al. ............... 340/825.07 |
| 4,726,027 | 2/1988 | Nakamura et al. ............... 371/32 |

FOREIGN PATENT DOCUMENTS

| 0163577 | 12/1985 | European Pat. Off. . |
| 0218248 | 12/1983 | Japan ........................ 371/33 |
| 59-167155 | 9/1984 | Japan . |
| 0068740 | 4/1985 | Japan ........................ 371/33 |
| 1470883 | 4/1977 | United Kingdom . |

Primary Examiner—Donald J. Yusko
Assistant Examiner—E. O. Pudpud
Attorney, Agent, or Firm—Antonelli, Terry & Wands

[57] ABSTRACT

In a simultaneous communication as in a POS system in which the same data including a multiplicity of data blocks is transmitted from a controller to a multiplicity of terminals all at once, the controller transmits all of the data blocks to the terminals without receiving any acknowledgement from each of the terminals in the course of data transmission. Each time the data block is received, the terminals hold information concerning the acknowledgement of the data block. After the termination of transmission of the whole of the data, the controller receives the acknowledgement information from each terminal into a management table. Based on the contents of the management table, the controller retransmits the data to a terminal(s) indicative of a negative acknowledgement in a similar manner to the above-mentioned data transmission or while taking acknowledgement for each data block.

11 Claims, 4 Drawing Sheets

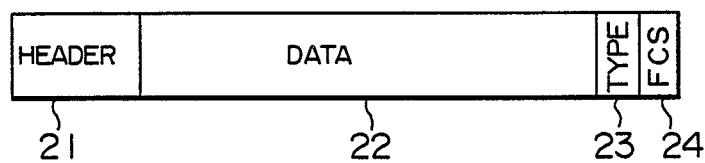

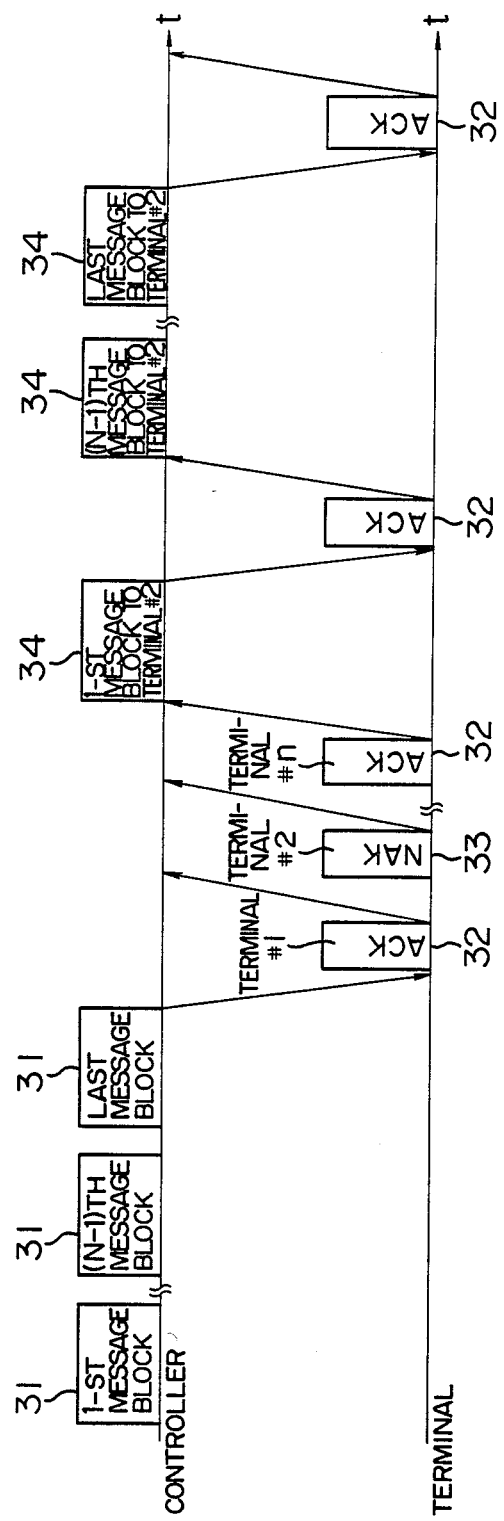

SIMULTANEOUS COMMUNICATION METHOD AND SYSTEM

BACKGROUND OF THE INVENTION

The present invention relates to a simultaneous communication (or multi-destination delivery) method and system for transmitting the same data to a plurality of terminal devices simultaneously, and more particularly to such a method and system which has a retransmission function and is suitable for transmission of a large amount of consecutive identical information at a high speed in a local network by which a plurality of devices, including microcomputers or the like, are interconnected with each other.

It is generally known that the sending of an acknowledgement in response to conventional simultaneous communication is carried out for each data block between a transmitter node and a plurality of receiver nodes or between the transmitter node and a node which is representative of a plurality of receiver nodes. An example of the latter technique is disclosed in JP-A-No. 59-167155.

A method in which a controller as a transmitter node awaits and acknowledgement from each terminal device serving as a receiver node in response to each transmission of one data block is effective against noise or and unfavorable environment in the case where the quality of a transmission circuit line is low. However, under more current conditions in which the quality of the transmission circuit line is very high, as experienced in recent years, such a method requires an extremely long wait time for receipt of the acknowledgement in transmitting a large amount of data, thereby making high speed communication difficult.

SUMMARY OF THE INVENTION

An object of the present invention is to provide a simultaneous communication method and system in which the efficiency of transmission of data is high and high speed communication is possible.

To attain the above object, according to the present invention, the sending of an acknowledgement between a device on the transmitter side and terminal devices on the receiver side is not effected in the course of transmission of data including a plurality of data blocks. The device on the transmitter side receives an acknowledgement from each or the terminal devices only after the termination of transmission of all the data blocks and thereafter retransmits the data to a terminal device(s) in which a reception error occurs.

In a simultaneous communication method and system according to the present invention, each of the terminal devices generates and holds response information of the respective data blocks each time the data block is received. After the termination of transmission of all the data blocks has been detected, the response information held in the respective terminal devices is successively sent to a transmitter controller which in turn judges whether or not a retransmission of data is necessary and performs the operation of data retransmission to the terminal device(s) which indicate that the data retransmission is necessary. With such a construction, the time (or cycle) for awaiting receipt of the acknowledgement from the receiver terminal devices for each transmission of one data block can be eliminated, though such a wait time was required in the conventional simultaneous communication method. As a result, the total time necessary for data transmission can be shortened greatly, for example, to about a half of tha in the conventional method.

The communication method according to the present invention is suitable for applications, such as a POS (Point Of Sales) system, in which the simultaneous transmission of the same data between a master unit and a plurality of slave units is necessary. The present communication method is based on the assumption that the frequency of occurrence of transmission error is very low.

BRIEF DESCRIPTION OF THE DRAWINGS

FIG. 3 shows an example of a message block format of a data block to be transmitted;

FIG. 4 shows an example of a retransmission management table;

FIG. 5 is a diagram for explaining an example of a cricuit line protocol according to an embodiment of the present invention.

DESCRIPTION OF THE PREFERRED EMBODIMENTS

Embodiments of the present invention will now be explained with reference to the accompanying drawings.

Figure 1:
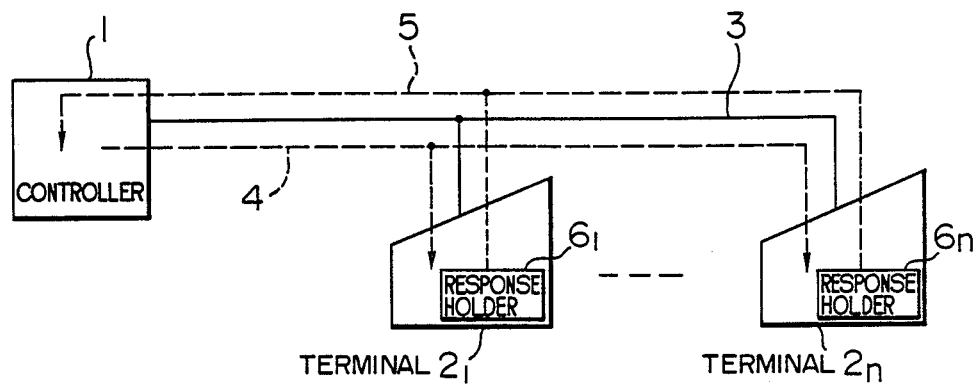
FIG. 1 is a block diagram of a communication system according to an embodiment of the present invention.

FIG. 1 shows a schematic block diagram of an embodiment in which a simultaneous communication method according to the present invention is applied to a POS system.

In general, a POS system is provided at each branch office and is connected to a host computer in a head office through a network. For each POS system, a master POS unit 1 serving as a controller for transmitting a message as POS data and a plurality of slave POS units $2_1, 2_2, - - - 2_n$ serving as terminals for receiving and processing the message are connected in a multidrop connection or loop connection manner by a cable 3 which forms communication paths between the master and slave POS units. The master POS unit 1 is usually provided with a backup master POS unit connected in parallel therewith. Upon start of the daily business, the master POS unit 1 transmits simultaneously to the slave POS units a slave operation program to operate each slave POS unit and routine application information, such as a price lookup table (PLU) which are in turn loaded into a RAM, etc. of the terminal slave POS umit. When any failure or erroneous operation takes place in the master POS unit 1, the backup master POS unit performs an alternative operation for simultaneous transmission of the above-mentioned information. A compensation technique for change-over between the master and backup master POS units is disclosed in the Yokoyama U.S. Pat. No. 4,775,976, (EP No. 86113078.9 filed Sept. 23, 1986) entitled "Method and Apparatus for Backing Up Data Transmission System" and assigned to the assignee of the present application.

Figure 2:
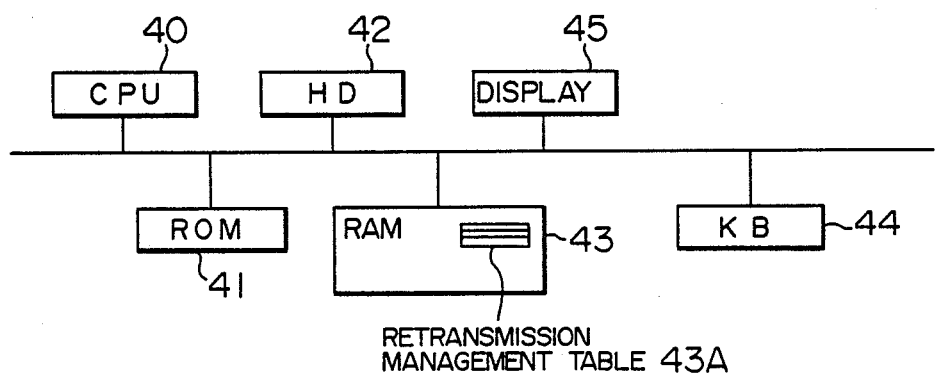
FIG. 2 shows an example of the construction of a controller shown in FIG. 1.

FIG. 2 shows an example of the construction of the controller 1. The controller 1 includes a processor (CPU) 40, a ROM 41 for storing programs, relating to IPL (initial program loader) etc., a fixed disk unit (HD)

42 for storing an application program, communication program, system control program etc., a memory 43 containing a retransmission management table 43A, an input/output keyboard (KB) 44, and a display output unit 45 such as CRT or printer.

In the communication system shown in FIG. 1, a transmission message 4 from the controller 1 is transmitted simultaneously to all of the terminals $2_1, 2_2, ---2_n$ through the cable 3. The terminals $2_1, ---2_n$ respectively comprise response holder $6_1, ---6_n$ to temporarily hold their response information generated in response to receipt of a message from the controller. After each terminal has received the whole of the message transmitted from the controller 1, the acknowledgement response 5 indicating whether or not the whole message has been received without any error is successively sent from the terminals to the controller 1 in accordance with a predetermined priority sequence concerning the timing of response. Information concerning the priority sequence is managed by the controller 1.

The POS message, which is data to be transmitted from the controller 1 to the terminals $2_1, 2_2, ---2_n$, has a data length of, for example, at most 1 M byte. The message is formed by a multiplicity of data blocks each of which has a block length of, for example, 512 bytes. The message includes the slave POS operation program and the PLU. Each of the data blocks is constructed with a message block format as shown in FIG. 3. Namely, each data block includes a sequential arrangement of a header field 21 having auxiliary information, such as a synchronizing signal, a data field 22 containing POS data inclusive of the application program, the PLU, etc., a data type field 23 indicating the type of the data contained in the data field 22, and a frame check sequence (FCS) 24 used for detecting an error in reception of the corresponding data block. The data type field may be included in the header field in accordance with the frame format of a communication protocol used, such as for example, the well-known HDLC (high-level data link control procedure).

Next, the concrete operation of the simultaneous communication system according to the present embodiment will be explained with reference to FIGS. 5 and 6.

First, as shown in the operation diagram of FIG. 5, the whole of a message 31 including N (N: any given integer) data blocks $31_1, 31_2, ---31_n$ is transmitted from the controller 1 to the plurality of terminals $2_1, 2_2, ---2_n$ simultaneously and in parallel. Each of the terminals receives the whole message 31 ($31_1, 31_2, ---31_n$) without sending an acknowledgement response signal to the controller 1 for each reception of one data block. When the data type field 23 in the data block indicates the last message block $31_n$ of the whole message 31, each terminal judges that the reception or transmission of the whole message is to be terminated and sends to the controller/an acknowledgement response ACK or NAK indicative of the presence or absence of error in the whole message as received thereby. This acknowledgement by each terminal is made by a response (ACK) signal 32 representative of a correct reception or a negative response (NAK) signal 33 representative of a defective reception. The sending of the acknowledgement responses from the terminals $2_1, 2_2, ---2_n$ to the controller or master POS unit 1 is performed under the control of the controller 1, namely, at a predetermined interval of time and in accordance with the priority sequence preliminarily alloted to the terminals so that the responses from the terminals to the controller 1 do not overlap each other. See steps 51 and 52 in a flow chart shown in FIG. 6.

Figure 6:
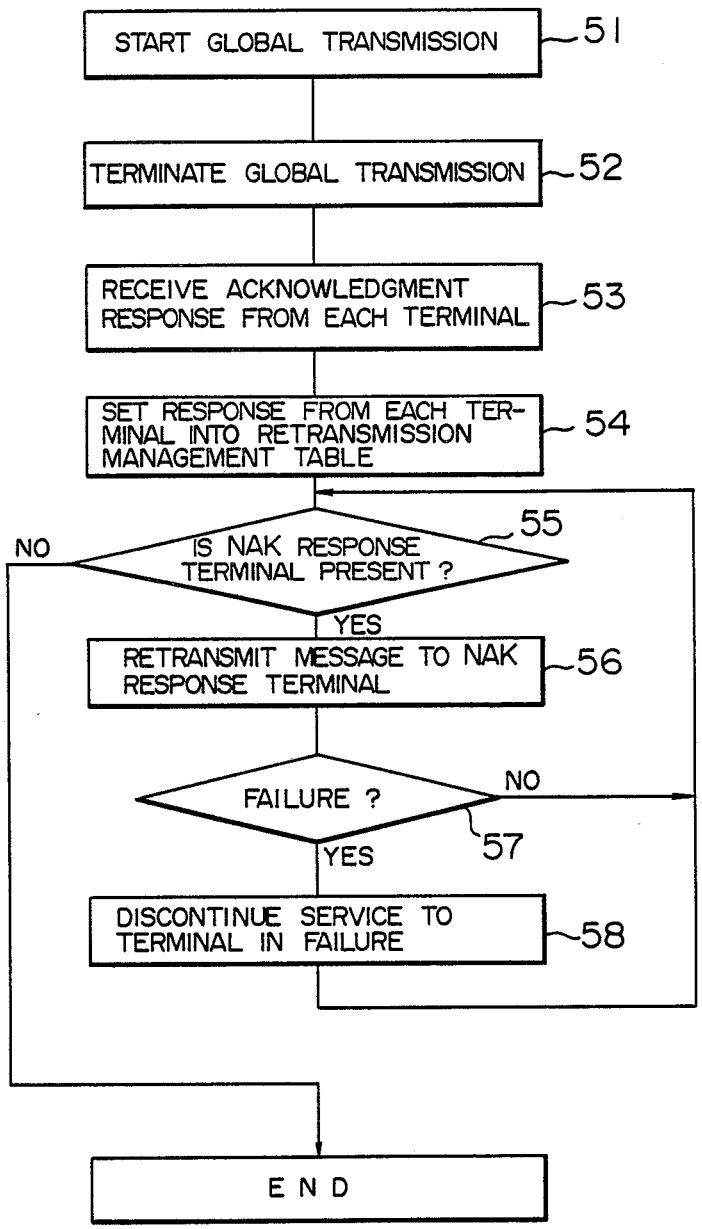
FIG. 6 is a flow chart for explaining the operation of the embodiment of the present invention.

The controller 1 receives the acknowledgement signals from the terminals (see step 53 in FIG. 6). The controller 1 has a retransmission management table 43A which includes a terminal number area 48 and an acknowledgement response setting area 49, as seen in FIG. 4. The received response ACK or NAK data is set into the area 49 of the retransmission management table 43A with the corresponding terminal number (see step 54 in FIG. 6). Thereafter, the controller 1 examines the acknowledgement area 49 of the retransmission management table 43A to check for the presence or absence of a terminal(s) which has issued the NAK response 33 indicative of the occurrence of a reception error (see step 55 in FIG. 6):

When there is no terminal in which a reception error occurs, the controller 1 terminates the operation of transmission of the message. If a terminal(s) in which a reception error occurs is present, the controller 1 transmits a retransmission message 34 (corresponding to the message 31) to that terminal (see step 56 in FIG. 6). In this retransmission operation, if there is detected the presence of a terminal which cannot receive the message correctly even with repetition of the retransmission a preset number of times (for example, three times), the controller 1 judges that the terminal is defective and operates to discontinue communication service to that terminal (see steps 57 and 58 in FIG. 6).

The controller 1 performs the above-mentioned retransmission operation in accordance with the contents of the retransmission management table to all of the terminals in which the reception error occurs. After having confirmed that the whole message could be correctly received by all of the terminals excepting a defective terminal(s), the controller 1 terminates the message transmission operation.

In the retransmission operation of the controller 1 exemplified in FIG. 5, the controller 1 transmits the retransmission message 34 inclusive of a plurality of data blocks in order to allowo retransmission to the terminal $2_2$ with the terminal number of 2 in which the reception error occurs, while receiving an acknowledgement response for each data block of the retransmission message 34. Such a retransmission operation, in which and acknowledgement response is received for each transmission of a data block, is carried out because the terminal which indicates the reception error may be defective in many cases. However, it does not necessarily follow that the retransmission operation is carried out while receiving an acknowledgement for each data block for each terminal. For example, the controller 1 may receive an acknowledgement after having transmitted the whole message to a terminal in which a reception error occurs. In the case where the reception error occurs in a plurality of terminals, a message transmission operation following the simultaneous communication method of the present invention can be repeated to only those terminals. Alternatively, the retransmission message may be transmitted simultaneously to the plurality of terminals involving the reception error while receiving an acknowledgement for each data block.

As has been mentioned above, when a message having a large amount of data is to be transmitted to a plurality of terminals, the time necessary for transmission of the message can be greatly reduced according to the present invention in comparison with the conventional method, which requires a long time for processing the acknowledgement from each terminal, since the acknowledgement is received for each transmission of one message data block. Therefore, in the present situation in which the quality of a transmission circuit line is improved, the present invention can realize a simultaneous communication at a low cost while maintaining a high reliability. For example, in the case where POS data of 520 K bytes is transmitted using the HDLC control program in the ROM of the master POS unit, the total transmission time when the present invention is employed is about five minutes, which is half of the time required in the conventional transmission method.

The foregoing explanation has been made in conjunction with an embodiment in which the present invention is applied to a POS system. However, the communication method of the present invention should not be limited to the disclosed embodiment.

We claim:

1. A simultaneous communication method of transmitting data, inclusive of a plurality of data blocks, in a local network in which the frequency of occurrence of transmission error is low, from a controller to a plurality of terminals all at once, comprising the steps of:
   (a) transmitting the data blocks of said data in sequence from said controller simultaneously to all of said plurality of terminals;
   (b) holding in each of said terminals a respective acknowledgement response for each data block; and
   (c) successively sending a single acknowledgement response from each of said terminals to said controller only upon termination of transmission of all of the data blocks of said data, said single acknowledgement response from each terminal indicating whether any data block in the data received by said terminal is erroneous data;
   wherein said controller retransmits all of the data on the basis of the acknowledgement response received from said terminals at least to ones of said terminals indicating a need for data retransmission, and said terminals which receive said retransmission send an acknowledgement response after each retransmission of one data block.

2. A simultaneous communication method according to claim 1, wherein said steps (a) and (b) are repeated on the basis of the acknowledgement response from said terminals for those terminals indicating the necessity of data retransmission.

3. A simultaneous communication method according to claim 2, wherein said controller discontinues the data retransmission to a terminal indicating the necessity of data retransmission when the number of times of data retransmission to that terminal exceeds a predetermined number, and said controller terminates its data transmission operation when an acknowledgement of correct receipt of said data is received from said terminals.

4. A simultaneous communication method according to claim 1, wherein said data has a data length in the order of 1 M byte and each of the data blocks has a block length in the order of 500 bytes.

5. A simultaneous communication system for transmitting data, inclusive of a plurality of data blocks, in a local network in which the frequency of occurrence of transmission error is low, from a controller simultaneously to a plurality of terminals, comprising:
   transmission designating means provided in said controller for transmitting said plurality of data blocks in sequence simultaneously to all terminals;
   response information holding means provided in each of said terminals for generating response information for each reception of one data block by that terminal and for holding the response information; and
   means for transmitting to said controller from each terminal a single response signal indicating whether the response information held in said response information holding means in the respective terminal includes an error indication only when information indicative of the termination of data transmission of all of said plurality of data blocks is detected in the respective terminal;
   wherein said controller includes response management memory means for receiving and storing the response signals from said terminals, and means responsive to the contents of said response management means for performing retransmission of the data to at least one of said terminals which indicates an unsuccessful response and said terminals include means responsive to receipt of retransmitted data for sending a response signal to said controller after each receipt of a data block.

6. A simultaneous communication method of transmitting data, inclusive of a series of data blocks, in a local network in which the frequency of occurrence of transmission error is low, from a controller to a plurality of terminals all at once, comprising the steps of:
   (a) transmitting a series of data blocks of said data from said controller to said plurality of terminals without receiving an acknowledgement for each data block, each terminal temporarily holding information representing acknowledgement and negative acknowledgement for each data block;
   (b) successively sending to said controller a respective information signal from each terminal representing whether a negative acknowledgement is held in the respective terminal upon termination of transmission of said series of data blocks; and
   (c) effecting retransmission of the entire series of data blocks by said controller in response to an information signal representing negative acknowledgement and sending an information signal from a terminal receiving retransmitted data after receipt of each retransmitted data block.

7. A simultaneous communication method according to claim 6, wherein said controller retransmits said series of data blocks when receiving an information signal from a terminal indicating negative acknowledgement upon each retransmission of one data block.

8. A simultaneous communication method according to claim 6, wherein said steps (a) and (b) are repeated each time the controller receives negative acknowledgement from said terminal, until the repetition reaches a given number of times.

9. A simultaneous communication method according to claim 8, wherein said controller discontinues the data retransmission to the terminal indicating the necessity of data retransmission when the number of times of data retransmission to that terminal exceeds a predetermined number, and said controller terminates its data transmission operation when responses indicative of the success of acknowledgement of said same data are received from the remaining terminals.

10. A simultaneous communication method according to claim 6, wherein said data has a data length in the order of 1 M byte and each of the data blocks has a block length in the order of 500 bytes.

11. A POS system according to claim 6, wherein said communication line is a local area network and said message block includes at least a price look-up table.

* * * * *